United States Patent
Lin et al.

(10) Patent No.: US 12,154,355 B2
(45) Date of Patent: Nov. 26, 2024

(54) TEXT IMAGE DEFECT DETECTION METHOD, COMPUTER DEVICE, AND STORAGE MEDIUM

(71) Applicant: HON HAI PRECISION INDUSTRY CO., LTD., New Taipei (TW)

(72) Inventors: Yen-Yi Lin, New Taipei (TW); Hui-Xian Yang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 397 days.

(21) Appl. No.: 17/847,371

(22) Filed: Jun. 23, 2022

(65) Prior Publication Data

US 2023/0086131 A1 Mar. 23, 2023

(30) Foreign Application Priority Data

Sep. 17, 2021 (CN) .......................... 202111091644.2

(51) Int. Cl.
*G06V 30/12* (2022.01)
*G01N 21/892* (2006.01)
*G06T 7/00* (2017.01)

(52) U.S. Cl.
CPC .......... *G06V 30/12* (2022.01); *G01N 21/892* (2013.01); *G06T 7/001* (2013.01); *G06T 2207/30* (2013.01)

(58) Field of Classification Search
None
See application file for complete search history.

(56) References Cited

U.S. PATENT DOCUMENTS

| 12,002,198 B2 * | 6/2024 | Li ......................... G06T 11/001 |
| 2020/0288030 A1 * | 9/2020 | Tsukamoto ........ H04N 1/00803 |
| 2022/0172337 A1 * | 6/2022 | Li ...................... G06V 30/1444 |
| 2023/0093969 A1 * | 3/2023 | Lin ...................... G06V 30/133 |
| | | 382/112 |

FOREIGN PATENT DOCUMENTS

CN 110293753 10/2019

* cited by examiner

*Primary Examiner* — Tsung Yin Tsai
(74) *Attorney, Agent, or Firm* — ScienBiziP, P.C.

(57) ABSTRACT

This application provides an image defect detection method. The method includes obtaining a first image and a second image of a flawless image. A third image is obtained from the second image and the first image, and a fourth image is obtained according to the second image and an image to be detected. A fifth image is obtained based on the third image and the second image. A sixth image is obtained based on the third image and the fourth image. A seventh image is obtained from the fifth image and the sixth image. A defect value of the fourth image is obtained according to the third image and the seventh image. A detection result of the fourth image is determined based on the defect value.

20 Claims, 5 Drawing Sheets

TEXT IMAGE DEFECT DETECTION METHOD, COMPUTER DEVICE, AND STORAGE MEDIUM

FIELD

The present disclosure relates to image defect detection technologies, in particular to a text image defect detection method, a computer device, and a storage medium.

BACKGROUND

At present, in the printing industry, a traditional automatic optical recognition method is used to recognize characters during a process of printing character. This method uses an interest region technology to compare regions in an image. Since there is no limit on the regions during comparison, it is easy to produce overkill phenomenon due to a subtle change of light source of the image, so a lot of manpower is needed in re-checking, wasting human resources and time. Further, because of limited vision and energy in human operators, and different standards applied by different inspectors, an accuracy of a recognition result is reduced.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
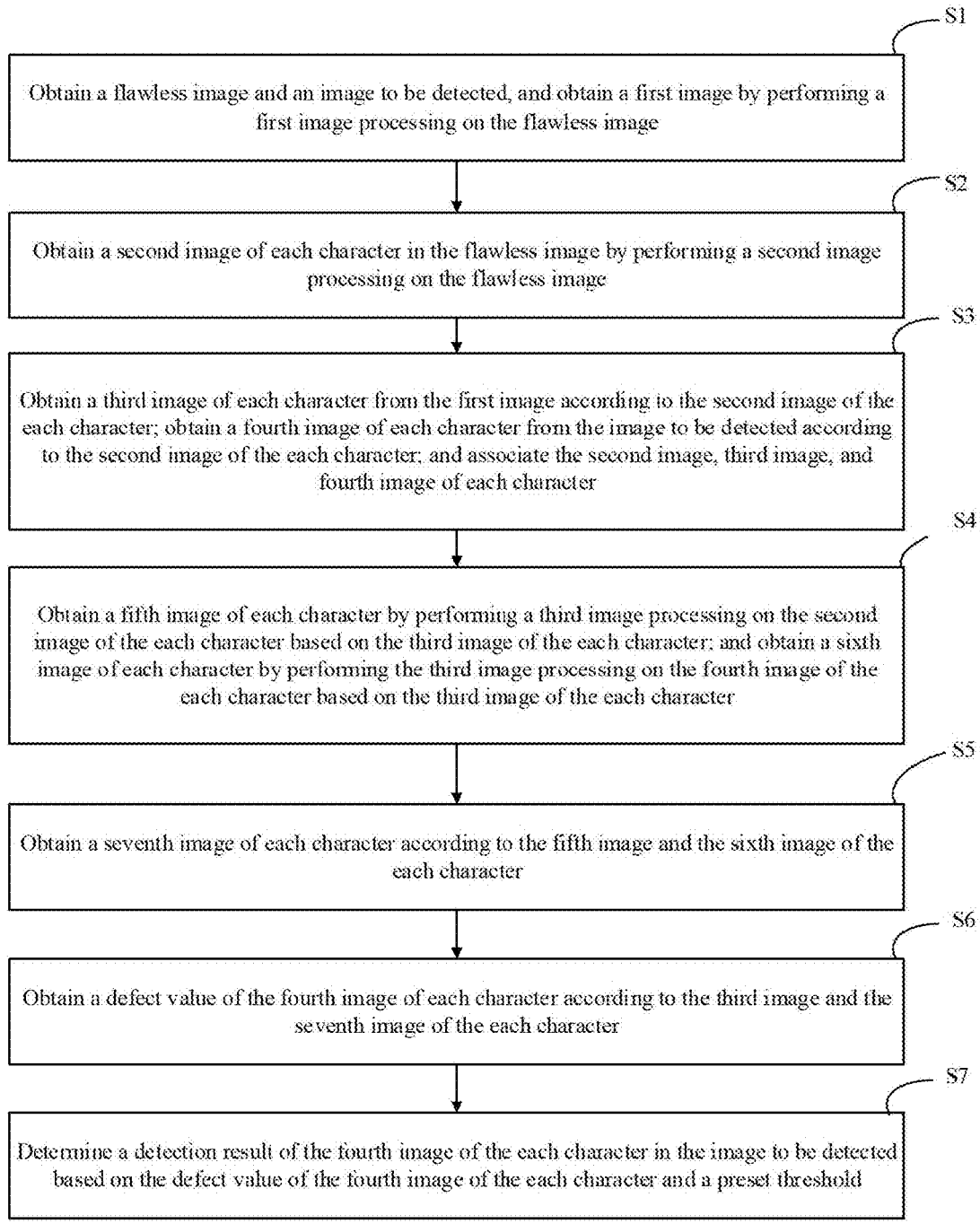
FIG. 1 is a flowchart of a method of an embodiment of detecting defects in a character image including characters provided by the present disclosure.

FIG. 1 illustrates a flow chart of one embodiment of a method of detecting defect of an image including characters (hereinafter named as "character image" or "text image").

Figure 2:
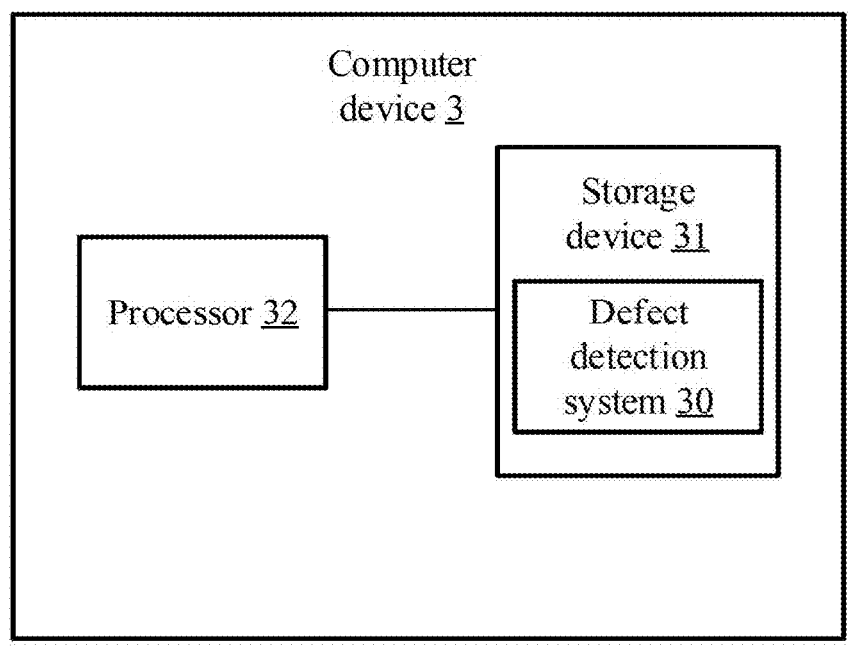
FIG. 2 is a structural diagram of an embodiment of a computer device provided by the present disclosure.

In one embodiment, the method of detecting defect of the character image (hereinafter named as "defect detection method" or "text image defect detection method") can be applied to a computer devices (such as a computer device 3 as shown in FIG. 2), for a computer device that needs to perform the defect detection method, a function of performing defect detection method can be directly integrated in the computer device, or can run on the computer device as a Software Development Kit (SDK).

As shown in FIG. 1, the defect detection method can include the following blocks. According to different requirements, the sequence of blocks in the flow chart can be changed, and some blocks can be omitted.

At block S1, the computer device obtains an image having no defect (hereinafter named as "flawless image") and an image to be detected, the computer device obtains a first image by performing a first image processing on the flawless image.

In one embodiment, the computer device can obtain the flawless image in response to user input. The flawless image can be pre-stored in a storage device of the computer device or can be pre-stored in another device connected with the computer device. For example, when the computer device detects an input signal, the computer device obtains the flawless image from the storage device. In this embodiment, the flawless image can be an image of a standard sample of a printed matter produced by a factory, and the flawless image contains characters (such as, Japanese characters, Chinese characters, numbers, English letters, etc.). It should be noted that an orientation of the characters in the flawless image does not need to be corrected. The image to be detected can be an image taken of the printed matter which needs to be detected. In one embodiment, a size of the image to be detected is consistent with that of the flawless image.

In one embodiment, before performing the first image processing on the flawless image, the computer device obtains position information of each character in the flawless image by locating a position of each character in the flawless image.

In one embodiment, the computer device can recognize the characters of the flawless image by using Optical Character Recognition (OCR) technology, then determine an area of characters (hereinafter named as "character area") and a background area of the flawless image, and determine a position of each character in the character area. The character area refers to a region containing the characters, and the computer device can determine the character area by using a region of interest (ROI) technology. The background area refers to an area that does not contain the characters, i.e., an area outside the character area in the flawless image.

In one embodiment, the performing the first image processing on the flawless image includes: obtaining a mask image of the flawless image according to the position information of each character in the flawless image by using the ROI technology; and setting the mask image as the first image.

In one embodiment, the first image includes: a first background image and a first character image. The first background image is used to mask the background area in the flawless image, and the first character image is used to mask an outline of the characters in the flawless image.

In one embodiment, the first background image is a binary image. A pixel value of the background area in the first background image is 0, and a pixel value of the outline of the characters in the first background image is 255.

In one embodiment, the first character image is a binary image. A pixel value of the background area in the first character image is 255, and a pixel value of the outline of the characters in the first character image is 0.

It should be noted that, in actual operation, the computer device can obtain the first background image only and the first background image can be used for subsequent detection, then a detection result obtained in block S7 is a defect detection result of the outline of the character in the fourth image.

In actual operation, the computer device can only obtain the first character image and use the first character image to perform subsequent detection, then a detection result obtained in block S7 is a defect detection result of the background area in the fourth image.

In actual operation, the computer device can obtain the first background image and the first character image for subsequent detection, and a detection result obtained in block S7 includes a defect detection result of the outline of the character in the fourth image and a defect detection result of the background area in the fourth image.

At block S2, the computer device obtains an image of each character (hereinafter named as "second image of each character") in the flawless image by performing a second image processing on the flawless image.

Figure 3:
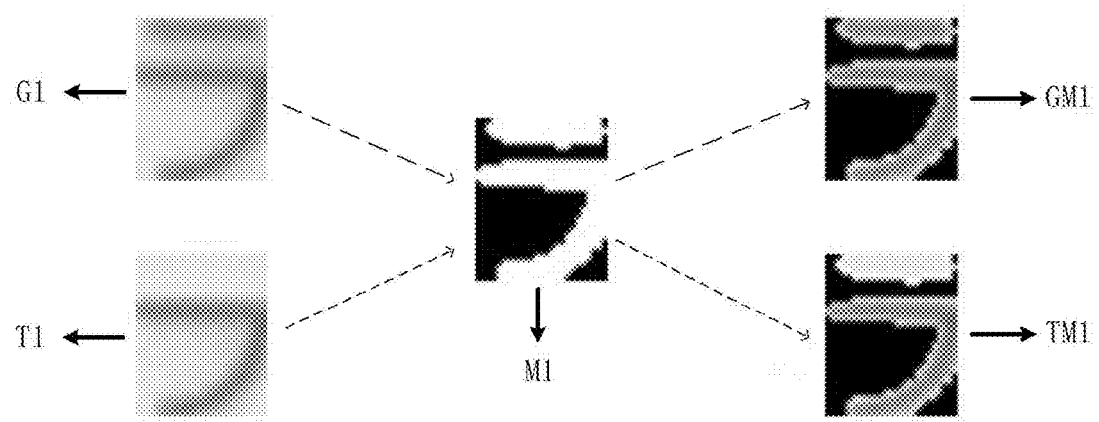
FIG. 3 is an example diagram of an embodiment of removing background provided by the present disclosure.
Figure 4:
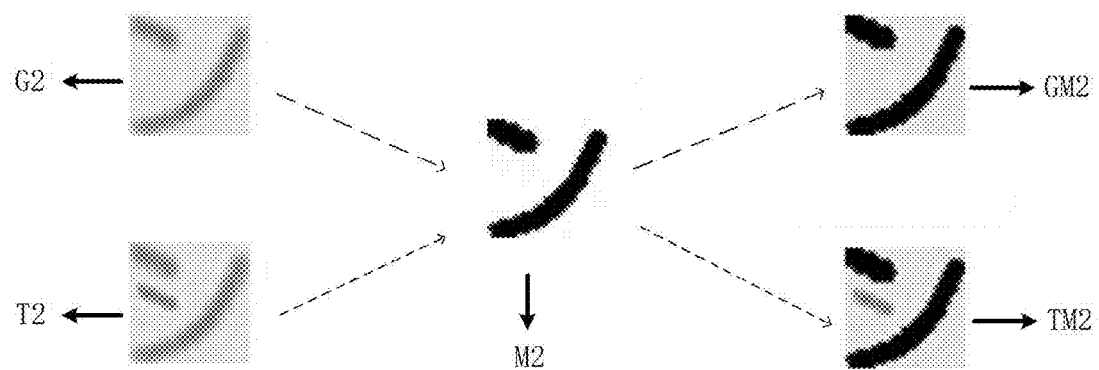
FIG. 4 is an example diagram of an embodiment of removing an outline of character provided by the present disclosure.

In one embodiment, the computer device performs the second image processing on the flawless image by: segmenting each character in the flawless image according to the position information of each character in the flawless image. The computer device can obtain an area of each character by segmenting the character area by using a character cutting function of an optical character recognition (OCR) software, therefore the second image of each character is obtained, the second image of each character includes an outline of the whole of each character. For example, the computer device can obtain a second image of each character by segmenting each character in the flawless image in a form of a rectangular frame, such as obtaining a second image G1 as shown in FIG. 3, and a second image G2 as shown in FIG. 4.

At block S3, the computer device obtains an image of each character from the first image (hereinafter named as "third image of each character") according to the second image of the each character; obtains an image of each character from the image to be detected (herein after named as "fourth image of each character") according to the second image of the each character; and associates the second image, third image, and fourth image of each character.

In one embodiment, the computer device takes the second image of each character as a target image, identifies the target image in the first image by using a template matching method (e.g., a feature match method), and cuts out the target image in the image to be detected, thereby obtaining the third image of each character in the first image that matches the second image of each character in the flawless image.

It should be noted that, in this embodiment, if the first image includes the first background image used to mask the background area in the flawless image and includes the first character image used to mask the outline of the characters in the flawless image, then the third image of each character includes a background image that is used to mask a background area of the each character (hereinafter named as "third background image of each character") and includes a character image used to mask an outline of the each character (hereinafter named as "third character image of each character"). Similarly, the third background image is a binary image, a pixel value of a background area in the third background image is 0, and a pixel value of an outline of the character in the third background image is 255. The third character image is a binary image, wherein the pixel value of the background area in the third character image is 255, and the pixel value of the outline of the character in the third character image is 0.

In one embodiment, by using the template matching method, the computer device sets the second image of each character as the target image, identifies the target image from the image to be detected, and obtains the fourth image of each character in the image to be detected that matches the second image of the each character in the flawless image, by cutting out the identified target image from the image to be detected.

Figure 5:
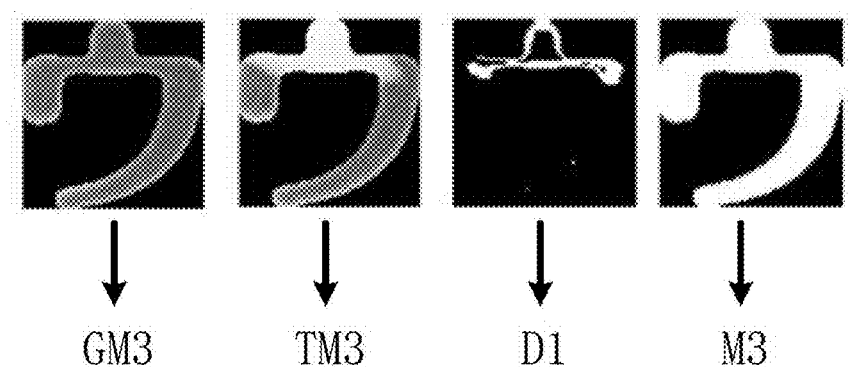
FIG. 5 is an example diagram of an embodiment of a seventh image obtained by removing the background provided by of the present disclosure.

For example, as shown in FIG. 3, a third background image M1 and a fourth image T1 are obtained according to the second image G1; as shown in FIG. 4, a third character image M2 and a fourth image T2 are obtained according to the second image G2; FIG. 5 shows an obtained third background image M3.

It should be noted that, at block S2, each character has a unique second image, therefore, a one-to-one correspondence is established between the second image and the third image of each character, and a size of the second image of each character is the same as a size of the third image of the each character. Likewise, a one-to-one correspondence is established between the second image and the fourth image of each character, and a size of the second image of each character is same as a size of the fourth image of the each character. Therefore, the computer device can take the second image of each character as a relationship node, establishes a one-to-one correspondence between the third image of each character and the fourth image of each character, and the size of the third image of each character is the same as the size of the fourth image of the each character. Therefore, a one-to-one correspondence is established between any two of the second image, the third image, and the fourth image of each character, and the sizes of the second image, the third image, and the fourth image of each character are the same.

At block S4, the computer device obtains a fifth image of each character by performing a third image processing on the second image of the each character based on the third image of the each character; and obtains a sixth image of each character by performing the third image processing on the fourth image of the each character based on the third image of the each character.

In one embodiment, performing the third image processing on the second image of the each character based on the third image of the each character includes: by using the third background image in the third image of the each character, removing a background outside the outline of the character in the second image of the each character, and removing a background outside the outline of the character in the fourth image of the each character; and/or by using the third character image in the third image of the each character, removing the outline of the character in the second image of the each character, and removing the outline of the character in the fourth image of the each character. In one embodiment, an operation of removing includes masking.

For example, as shown in FIG. 3, a fifth image GM1 is obtained by masking the second image G1 with the third background image M1, and the sixth image TM1 is obtained by masking the fourth image T1 with the third background image M1. As shown in FIG. 4, the fifth image GM2 is obtained by masking the second image G2 with the third character image M2, and the sixth image TM2 is obtained by masking the fourth image T2 with the third character image M2. As shown in FIG. 5, the fifth image GM3 and the sixth image TM3 are obtained using the third background image M3.

At block S5, the computer device obtains a seventh image of each character according to the fifth image and the sixth image of the each character.

In one embodiment, the computer device obtains a difference image between the fifth image and the sixth image of the each character by using a Structural Similarity (SSIM) algorithm, and sets the difference image as the seventh image of the each character, the seventh image of the each character is a binary image, wherein a pixel value of a background area in the seventh image of the each character is 0, and a pixel value of an outline of the character in the seventh image of the each character is 0 255. For example, the computer device can obtain the seventh image of the each character by using a software such as Python, OpenCV, scikit-image, or imutils based on the SSIM algorithm.

Figure 6:
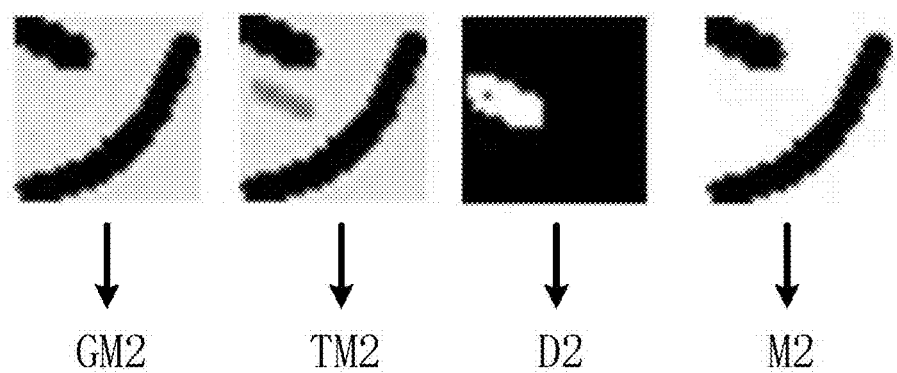
FIG. 6 is an example diagram of an embodiment of a seventh image obtained by removing the outline of character provided by the present disclosure.

For example, as shown in FIG. 5, a seventh image D1 is obtained according to the fifth image GM3 and the sixth image TM3; as shown in FIG. 6, the seventh image D2 is obtained according to the fifth image GM2 and the sixth image TM2.

At block S6, the computer device obtains a defect value of the fourth image of each character according to the third image and the seventh image of the each character.

In one embodiment, the computer device calculates a ratio value between a first area and a second area. The first area is an area of a predetermined pixel value (e.g., 255) in the seventh image of the each character, and the second area is an area of the predetermined pixel value in the third image of the each character. The computer device takes the ratio value as the defect value of the fourth image of the each character. For example, an area of the white pixels each of which having a pixel value of 255 in the seventh image of the each character equals a, and an area of the white pixels each of which having the pixel value of 255 in the third image of the each character equals b, the computer obtains a ratio c between a and b, and takes the ratio c as the defect value of the fourth image of the each character.

For example, in FIG. 5, the defect value obtained according to the seventh image D1 and the third background image M3 is 0.17; as shown in FIG. 6, the defect value obtained from the seventh image D2 and the third character image M2 is 0.078.

At block S7, the computer device determines a detection result of the fourth image of the each character in the image to be detected based on the defect value of the fourth image of the each character and a preset threshold.

Figure 7:
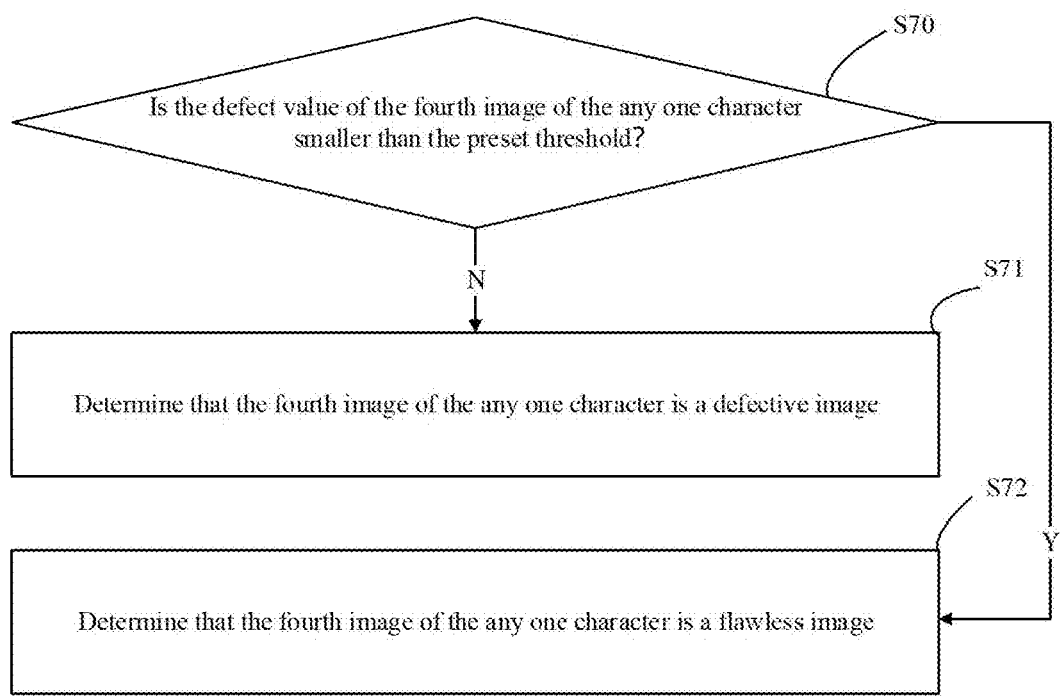
FIG. 7 is a flowchart of an embodiment of block S7 provided by the present disclosure.

In one embodiment, the preset threshold may be 0.02. A flowchart of block S7 is shown in FIG. 7, and the details are as follows.

At block S70, for the fourth image of any one character, the computer device compares the defect value of the fourth image of the any one character with the preset threshold; when the defect value of the fourth image of the any one character is greater than or equal to the preset threshold, the process goes to block S71; and when the defect value of the fourth image of the any one character is smaller than the preset threshold, the process goes to block S72.

At block S71, the computer device determines that the fourth image of the any one character is a defective image.

For example, in FIG. 6, the defect value obtained according to the seventh image D2 and the third character image M2 is 0.078, which is greater than the preset threshold value 0.02, the computer device can determine that the fourth image T2 as shown in in FIG. 4 is a defective image.

At block S72, the computer device determines that the fourth image of the any one character is a flawless image.

That is, according to blocks S70-S72, the computer device obtain the detection result of the fourth image of each character in the image to be detected.

FIG. 1 describes in detail the defect detection method of the present disclosure. Hardware architecture that implements the defect detection method is described in conjunction with FIG. 2.

It should be understood that the described embodiments are for illustrative purposes only, and are not limited by this structure in the scope of the claims.

FIG. 2 is a block diagram of a computer device provided by the present disclosure. The computer device 3 may include a storage device 31 and at least one processor 32. It should be understood by those skilled in the art that the structure of the computer device 3 shown in FIG. 2 does not constitute a limitation of the embodiment of the present disclosure. The computer device 3 may further include other hardware or software, or the computer device 3 may have different component arrangements.

In at least one embodiment, the computer device 3 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the computer device 3 is merely an example, and other existing or future electronic products may be included in the scope of the present disclosure, and are included in the reference.

In some embodiments, the storage device 31 can be used to store program codes of computer readable programs and various data, such as the defect detection system 30 installed in the computer device 3, and automatically access the programs or data with high speed during the running of the computer device 3. The storage device 31 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the computer device 3 that can be used to carry or store data.

In some embodiments, the at least one processor 32 may be composed of an integrated circuit, for example, may be composed of a single packaged integrated circuit, or multiple integrated circuits of same function or different functions. The at least one processor 32 can include one or more central processing units (CPU), a microprocessor, a digital processing chip, a graphics processor, and various control chips. The at least one processor 32 is a control unit of the computer device 3, which connects various components of the computer device 3 using various interfaces and lines. By running or executing a computer program or modules stored in the storage device 31, and by invoking the data stored in the storage device 31, the at least one processor 32 can perform various functions of the computer device 3 and process data of the computer device 3. For example, the processor 32 may perform the defect detection function shown in FIG. 1.

In some embodiments, the defect detection system 30 operates in computer device 3. The defect detection system 30 may include a plurality of functional modules composed of program code segments. The program code of each program segment in the defect detection system 30 can be stored in storage device 31 of the computer device 3 and executed by at least one processor 32 to achieve blocks S1-S7 as shown in FIG. 1.

In this embodiment, the defect detection system 30 can be divided into a plurality of functional modules. The module means a series of computer program segments that can be executed by at least one processor 32 and perform fixed functions and are stored in storage device 31.

The program codes are stored in storage device 31 and at least one processor 32 nay invoke the program codes stored in storage device 31 to perform the related function. The program codes stored in the storage device 31 can be executed by at least one processor 32, so as to realize the function of each module to achieve the purpose of defect detection of the character image as shown in FIG. 1.

In one embodiment of this application, said storage device 31 stores at least one instruction, and said at least one instruction is executed by said at least one processor 32 for the purpose of defect detection of the character image as shown in FIG. 1.

Although not shown, the computer device 3 may further include a power supply (such as a battery) for powering various components. Preferably, the power supply may be logically connected to the at least one processor 32 through a power management device, thereby, the power management device manages functions such as charging, discharging, and power management. The power supply may include one or more DC or AC power sources, a recharging device, a power failure detection circuit, a power converter or inverter, a power status indicator, and the like. The computer device 3 may further include various sensors, such as a BLUETOOTH module, a WI-FI module, and the like, and details are not described herein.

In the several embodiments provided in this disclosure, it should be understood that the devices and methods disclosed can be implemented by other means. For example, the device embodiments described above are only schematic. For example, the division of the modules is only a division according to logical function, which can be implemented in another way.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A method of detecting image defect applied to a computer device, the method comprising:
   obtaining a flawless image and an image to be detected, and obtaining a first image by performing a first image processing on the flawless image;
   obtaining a second image of each character in the flawless image by performing a second image processing on the flawless image;
   obtaining a third image of each character from the first image according to the second image of the each character; obtaining a fourth image of each character from the image to be detected according to the second image of the each character; and associating the second image, third image, and fourth image of each character,
   obtaining a fifth image of each character by performing a third image processing on the second image of the each character based on the third image of the each character; and obtaining a sixth image of each character by performing the third image processing on the fourth image of the each character based on the third image of the each character;
   obtaining a seventh image of each character according to the fifth image and the sixth image of the each character;
   obtaining a defect value of the fourth image of each character according to the third image and the seventh image of the each character;
   determining a detection result of the fourth image of the each character in the image to be detected based on the defect value of the fourth image of the each character and a preset threshold.

2. The method according to claim 1, further comprising:
   before performing the first image processing on the flawless image, obtaining position information of each character in the flawless image by locating a position of each character in the flawless image.

3. The method according to claim 2, wherein the performing the first image processing on the flawless image comprises:
   obtaining a mask image of the flawless image according to the position information of each character in the flawless image; and setting the mask image as the first image.

4. The method according to claim 2, wherein the performing the second image processing on the flawless image comprises:
segmenting each character in the flawless image according to the position information of each character in the flawless image.

5. The method according to claim 1, wherein the "obtaining a third image of each character from the first image according to the second image of the each character; obtaining a fourth image of each character from the image to be detected according to the second image of the each character; and associating the second image, third image, and fourth image of each character" comprises:
taking the second image of each character as a target image, identifying the target image in the first image, and cutting out the target image in the image to be detected, thereby obtaining the third image of each character in the first image that matches the second image of each character in the flawless image; and
setting the second image of each character as the target image, identifying the target image from the image to be detected, and obtaining the fourth image of each character in the image to be detected that matches the second image of the each character in the flawless image, by cutting out the identified target image from the image to be detected.

6. The method according to claim 1, wherein the performing the third image processing on the second image of the each character based on the third image of the each character comprises:
by using a third background image in the third image of the each character, removing a background outside the outline of the character in the second image of the each character, and removing a background outside the outline of the character in the fourth image of the each character; and/or
by using a third character image in the third image of the each character, removing the outline of the character in the second image of the each character, and removing the outline of the character in the fourth image of the each character.

7. The method according to claim 1, wherein the "obtaining a seventh image of each character according to the fifth image and the sixth image of the each character" comprises:
obtaining a difference image between the fifth image and the sixth image of the each character by using a structural similarity algorithm, and setting the difference image as the seventh image of the each character.

8. The method according to claim 1, wherein the "obtaining a defect value of the fourth image of each character according to the third image and the seventh image of the each character: determining a detection result of the fourth image of the each character in the image to be detected based on the defect value of the fourth image of the each character and a preset threshold" comprise:
calculating a ratio value between a first area and a second area, the first area representing an area of a predetermined pixel value in the seventh image of the each character, and the second area representing an area of the predetermined pixel value in the third image of the each character;
setting the ratio value as the defect value of the fourth image of the each character;
for the fourth image of any one character, comparing the defect value of the fourth image of the any one character with the preset threshold;
determining that the fourth image of the any one character is a defective image in response that the defect value of the fourth image of the any one character is greater than or equal to the preset threshold; and
determining that the fourth image of the any one character is a flawless image in response that the defect value of the fourth image of the any one character is smaller than the preset threshold.

9. A computer device comprising:
a storage device;
at least one processor; and
the storage device storing one or more programs, which when executed by the at least one processor, cause the at least one processor to:
obtain a flawless image and an image to be detected, and obtain a first image by performing a first image processing on the flawless image;
obtain a second image of each character in the flawless image by performing a second image processing on the flawless image;
obtain a third image of each character from the first image according to the second image of the each character; obtain a fourth image of each character from the image to be detected according to the second image of the each character; and associate the second image, third image, and fourth image of each character;
obtain a fifth image of each character by performing a third image processing on the second image of the each character based on the third image of the each character; and obtain a sixth image of each character by performing the third image processing on the fourth image of the each character based on the third image of the each character;
obtain a seventh image of each character according to the fifth image and the sixth image of the each character;
obtain a defect value of the fourth image of each character according to the third image and the seventh image of the each character;
determine a detection result of the fourth image of the each character in the image to be detected based on the defect value of the fourth image of the each character and a preset threshold.

10. The computer device according to claim 9, where the at least one processor is further caused to:
before performing the first image processing on the flawless image, obtain position information of each character in the flawless image by locating a position of each character in the flawless image.

11. The computer device according to claim 10, wherein the at least one processor performs the first image processing on the flawless image by:
obtaining a mask image of the flawless image according to the position information of each character in the flawless image; and
setting the mask image as the first image.

12. The computer device according to claim 10, wherein the at least one processor performs the second image processing on the flawless image by:
segmenting each character in the flawless image according to the position information of each character in the flawless image.

13. The computer device according to claim 9, wherein the "obtain a third image of each character from the first image according to the second image of the each character; obtain a fourth image of each character from the image to be detected according to the second image of the each character; and associate the second image, third image, and fourth image of each character" comprises:

taking the second image of each character as a target image, identifying the target image in the first image, and cutting out the target image in the image to be detected, thereby obtaining the third image of each character in the first image that matches the second image of each character in the flawless image; and setting the second image of each character as the target image, identifying the target image from the image to be detected, and obtaining the fourth image of each character in the image to be detected that matches the second image of the each character in the flawless image, by cutting out the identified target image from the image to be detected.

14. The computer device according to claim 9, wherein the at least one processor performs the third image processing on the second image of the each character based on the third image of the each character by:

by using a third background image in the third image of the each character, removing a background outside the outline of the character in the second image of the each character, and removing a background outside the outline of the character in the fourth image of the each character; and/or by using a third character image in the third image of the each character, removing the outline of the character in the second image of the each character, and removing the outline of the character in the fourth image of the each character.

15. The computer device according to claim 9, wherein the "obtain a seventh image of each character according to the fifth image and the sixth image of the each character" comprises:

obtaining a difference image between the fifth image and the sixth image of the each character by using a structural similarity algorithm, and setting the difference image as the seventh image of the each character.

16. The computer device according to claim 9, wherein the "obtain a defect value of the fourth image of each character according to the third image and the seventh image of the each character; determine a detection result of the fourth image of the each character in the image to be detected based on the defect value of the fourth image of the each character and a preset threshold" comprise:

calculating a ratio value between a first area and a second area, the first area representing an area of a predetermined pixel value in the seventh image of the each character, and the second area representing an area of the predetermined pixel value in the third image of the each character;

setting the ratio value as the defect value of the fourth image of the each character;

for the fourth image of any one character, comparing the defect value of the fourth image of the any one character with the preset threshold;

determining that the fourth image of the any one character is a defective image in response that the defect value of the fourth image of the any one character is greater than or equal to the preset threshold; and determining that the fourth image of the any one character is a flawless image in response that the defect value of the fourth image of the any one character is smaller than the preset threshold.

17. A non-transitory storage medium having stored thereon at least one computer-readable instructions, which when executed by a processor of a computer device, causes the processor to perform a method of detecting image defect, wherein the method comprises:

obtaining a flawless image and an image to be detected, and obtaining a first image by performing a first image processing on the flawless image;

obtaining a second image of each character in the flawless image by performing a second image processing on the flawless image;

obtaining a third image of each character from the first image according to the second image of the each character; obtaining a fourth image of each character from the image to be detected according to the second image of the each character; and associating the second image, third image, and fourth image of each character, obtaining a fifth image of each character by performing a third image processing on the second image of the each character based on the third image of the each character; and obtaining a sixth image of each character by performing the third image processing on the fourth image of the each character based on the third image of the each character;

obtaining a seventh image of each character according to the fifth image and the sixth image of the each character;

obtaining a defect value of the fourth image of each character according to the third image and the seventh image of the each character;

determining a detection result of the fourth image of the each character in the image to be detected based on the defect value of the fourth image of the each character and a preset threshold.

18. The non-transitory storage medium according to claim 17, wherein the method further comprises:

before performing the first image processing on the flawless image, obtaining position information of each character in the flawless image by locating a position of each character in the flawless image.

19. The non-transitory storage medium according to claim 18, wherein the performing the first image processing on the flawless image comprises:

obtaining a mask image of the flawless image according to the position information of each character in the flawless image; and setting the mask image as the first image.

20. The non-transitory storage medium according to claim 18, wherein the performing the second image processing on the flawless image comprises:

segmenting each character in the flawless image according to the position information of each character in the flawless image.

* * * * *